United States Patent [19]

Grotloh

[11] Patent Number: 4,589,627
[45] Date of Patent: May 20, 1986

[54] PRESSURE MEDIUM ACTUATED VALVE

[75] Inventor: Karlheinz Grotloh, Winterthur, Switzerland

[73] Assignee: Sulzer Brothers Limited, Winterthur, Switzerland

[21] Appl. No.: 695,266

[22] Filed: Jan. 28, 1985

[30] Foreign Application Priority Data

Jan. 26, 1984 [CH] Switzerland ............................ 358/84

[51] Int. Cl.$^4$ .......................................... F16K 31/124
[52] U.S. Cl. .................................. 251/25; 251/30.01; 251/31; 91/399; 91/416; 92/85 B
[58] Field of Search ............... 251/25, 30, 31; 91/399, 91/416; 92/85 B

[56] References Cited

U.S. PATENT DOCUMENTS

| 1,490,633 | 4/1924 | Peters | 91/399 X |
| 1,641,131 | 8/1927 | Baker et al. | 91/399 X |
| 2,587,539 | 2/1952 | Seaman | 137/144 |
| 2,635,634 | 4/1953 | Thurber, Jr. | 137/653 |
| 2,867,081 | 9/1957 | Black | 29/252 |
| 3,814,375 | 6/1974 | Grotloh | 251/28 |

Primary Examiner—Samuel Scott
Assistant Examiner—Allen J. Flanigan
Attorney, Agent, or Firm—Kenyon & Kenyon

[57] ABSTRACT

The pressure-medium-actuated valve has a pressure medium inlet, a pressure medium outlet and a cylinder. A piston which is connected to a lid is movable in the cylinder and subdivides the cylinder into a first piston chamber and a second piston chamber. Two relief lines, each comprising a control valve are connected to the piston chambers and extend to a pressure medium sink. A first connecting line comprising a control valve extends from the inlet to the first piston chamber and a second connecting line comprising a control valve extends from the inlet to the second piston chamber. A third connecting line is disposed in the wall of the valve body and extends at one end into the first connecting line. The other end of the third connecting line is connected to the cylinder at a place which, with the piston in the operative position, extends into the second piston chamber and, with the piston in the safety position, extends into the first piston chamber.

7 Claims, 2 Drawing Figures

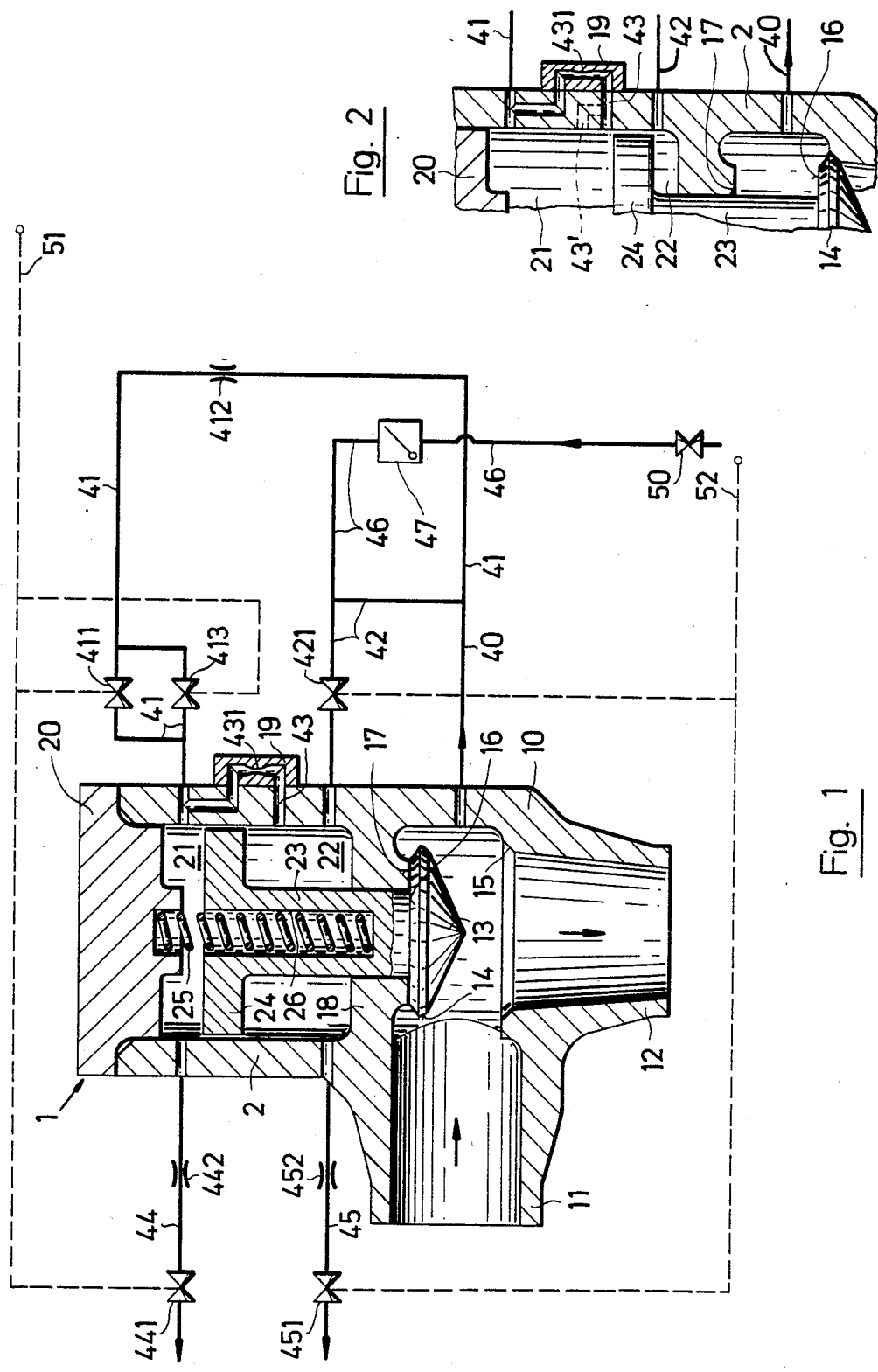

PRESSURE MEDIUM ACTUATED VALVE

This inventions relates to a pressure medium actuated valve.

Heretofore, various types of pressure medium actuated valves have been known. In some cases, the valves have a casing provided with a cylinder in which a piston can move so as to effect an opening or closing of the valve by moving a valve lid relative to an outlet of the valve. Usually, the piston is positioned to move between an operative position corresponding to an open valve and a safety position corresponding to a closed valve. Further, springs have been provided to bias the piston towards the safety position.

In order to move the piston from the operative position into the saftey position and vice versa, the valves have been provided with pressure lines which communicate a pressure chamber of the valve with each of the sub-chambers into which the cylinder is divided by the piston. Additional relief lines are also provided for each of these piston chambers and suitable control valves have been provided not only in the relief lines but also in the connecting lines to the piston chambers.

During the usual normal operation of such valves, the piston and lid are retained in the operative position by the pressure of the medium flowing through the valve. Should a reason occur to close the valve, the piston and lid are moved into the safety position via the connecting lines between the pressure or valve chamber and the piston chambers. Generally, this requires abutting of the lid against the surface within the valve in order to close the outlet of the valve. Further, when the valve is reopened, the lid is usually brought up against a second surface which corresponds to the operative position In valves of the above type, the moving system which is comprised of the piston, lid and a rod which usually connects the piston to the lid may impinge very rapidly on the associated surface in the casing in the two end positions of the lid. Thus, there is a risk of the valve being damaged. Another risk, which is connected with a very fast closing movement, is the production of pressure waves in the pressure medium present in the pipe line connected to the valve. Such pressure waves may cause damage to the pipe line.

Accordingly, it is an object of the invention to provide a valve in which a moving system for opening and closing of the valve may move against an associated surface at a speed which should not damage the valve.

It is another object of the invention to provide an existing valve with a simple addition which avoids heavy impacting of a moving system of the valve on an associated end surface.

It is another object of the invention to reduce the risk of creating pressure waves in a pipe line connected to a valve which is being closed at a relatively fast rate.

Briefly, the invention is directed to a pressure medium actuated valve which is constructed with a casing having a valve chamber, an inlet for conveying a pressure medium to the chamber, an outlet for conveying pressure medium from the chamber and a cylinder sealingly spaced from the chamber. In addition, the valve has a piston movably mounted in the cylinder to divide the cylinder into a first piston chamber which enlarges upon movement of the piston from an operative position to a safety position within the cylinder and a second piston chamber which decreases upon the piston movement. Further, the valve has a rod which extends from the piston into the valve chamber and which carries a lid within the valve chamber for closing the outlet from the valve chamber. At least one spring is also provided in the cylinder to bias the piston towards the safety position.

The valve is also provided with relief lines which extend from the respective piston chambers to a pressure medium sink, such as atmosphere, as well as control valves in the relief lines for controlling the flow of pressure medium therethrough. As is known, connecting lines are also connected between the valve chamber and the respective piston chambers with control valves in each connecting line for controlling a flow of pressure medium therethrough.

In accordance with the invention, a third connecting line is provided. This third connecting line has one end connected to a chamber part extending from the cylinder-side end of the control valve in the first connecting line through the first connecting line, the first piston chamber and the relief line connected to the first piston chamber to the cylinder-side end of the control valve in this relief line. The second end of the third connecting line is connected to the casing at a position which communicates with the second piston chamber with the piston in the operative position and which communicates with the first piston chamber with the piston in the safety position.

The arrangement of the third connecting line means that the lid can move relatively fast into each of the two end positions of the lid but without heavy impacting of the associated end surface. This is because the moving system comprised of the piston, rod and lid experiences increasing braking until shortly before the system reaches the end surface and then moves into the end position at a sufficiently low and substantially constant speed. A particular advantage is that this effect is achieved without any need for additional moving parts, such as valves.

Another particular advantage of the third connecting line is that the line can be fitted to existing valves at relatively little cost.

These and other objects and advantages of the invention will become more apparent from the following detailed description taken in conjunction with the accompanying drawings wherein:

FIG. 1 illustrates a cross-sectional view of a valve constructed in accordance with the invention; and FIG. 2 illustrates a part of the valve of FIG. 1 in a safety position.

Referring to FIG. 1, the pressure medium actuated valve 1 has a casing 10 and a cover 20 which is sealingly secured to the body 10 by screws (not shown). The casing includes an inlet 11 for conveying a pressure medium from a suitable supply (not shown) into a valve chamber, an outlet 12 for conveying the pressure medium from the valve chamber and a cylinder 2 sealingly spaced from the valve chamber.

The cylinder 2 which extends toward the cover 20 has a piston, such as a servo piston 24, movably mounted therein in order to divide the cylinder 2 into a pair of piston chambers 21, 22. The piston 24 is rigidly connected by a rod 23 which extends from the piston 24 into the valve chamber to a lid 13 within the valve chamber.

The lid 13 is disposed for movement in the valve chamber, i.e. in the pressure zone of the inlet 11 and has a conical sealing surface 14 on the side facing the outlet 12 which, when the valve is closed, engages a sealing seat 15 in the casing 10. On the side distal from the outlet 12, the lid 13 has a back seat 16 which, with the lid 13 fully opened, sealingly engages an abutment surface 17 in the casing 10.

As indicated, the rod 23 extends through a cylinder end 18 which separates the lower or second piston chamber 22 from the pressure zone of the inlet 11 in every position of the lid 13. Sealing means (not shown) are provided in the member 18 to extend around the rod 23 for sealing purposes.

A helical compression spring 25 is provided in the upper or first piston chamber 21 and extends between the cover 20 and the base of a bore 26 which extends through the piston 24 into the rod 23. This spring 25 serves to bias the piston 24, rod 23 and lid 13 towards a safety position.

In the position shown in FIG. 1, the valve is in an operative position. Upon movement of the piston 24 from the operative position shown to a safety position, the first piston chamber 21 enlarges while the second piston chamber 22 decreases.

A distribution line 40 communicates with the pressure zone of the inlet 11 to convey pressure medium to a first connecting line 41 which extends to the first piston chamber 21. As indicated, the connecting line 41 includes a pair of parallel connected magnetic control valves 411, 413 which serve to control the flow of pressure medium therethrough and a restrictor 412 upstream of the control valves 411, 413.

In a similar manner, a second connecting line 42 extends from the distribution line 40 to the second piston chamber 22 via a magnetic control valve 421 which controls the flow of pressure medium therethrough. In addition, a line 46 is connected to the connecting line 42 in order to convey an external medium thereto via a check valve 47 and a suitable control valve 50 upstream of the check valve 47.

A first relief line 44 extends from the first piston chamber 21 to a pressure medium sink, such as the atmosphere while a second relief line 45 extends from the second piston chamber 22 to a pressure medium sink again, the atmosphere. In addition, a magnetic control valve 441, 451 is disposed in each respective relief line 44, 45 along with a restrictor 442, 452 upstream of the respective control valve 441, 451.

A cavity or chamber part thus extends from the cylinder-side end of the control valves 411, 413 through the connecting line 41, first piston chamber 21 and first relief line 44 to the cylinder-side end of the control valve 441.

A third connecting line 43 has one end connected to the chamber part extending between the valves 411, 413 and 441 and a second end connected to the casing 10 at a position which communicates with the second piston chamber 22 with the piston 24 in the operative position shown and which communicates with the first piston chamber 21 with the piston 24 in the lowered safety position as indicated in FIG. 2. The third connecting line 43 extends mainly through the wall of the cylinder 2 and has a restrictor 431 disposed within a wall part 19 which is externally connectable to the cylinder 2 by screws (not shown). The restrictor 431 can therefore be readily replaced.

As an alternative, the end of the connecting line 43 which is connected to the chamber part formed, in part, by the first piston chamber 21, may extend into the first connecting line 41 or the first relief line 44 provided the places of joining are disposed on the cylinder-side of the respective valves 411, 413 and 441.

A single control line 51 is connected to the control valves 411, 413, 441 for simultaneous actuation of these valves. In this regard, the control valve 441 in the relief line 44 is in a closed state when the line 51 is dead while the control valves 411, 413 are open. In like manner, a single control line 52 is connected to the control valve 421 in the second connecting line 42 and the control valve 451 in the second relief line 45 for simultaneously actuating these valves. In this regard, the control valve 451 is open and the control valve 421 is closed with the line 52 dead.

The valve 1 operates as follows:

With the valve 1 open—i.e., in the operative position—pressure medium issues from the supply, for instance, a vapor generator, through the inlet 11 into the valve casing 10 and issues therefrom through the outlet 12. In normal operation the valves 441, 411, 413 are energized by way of the control line 51 so that the valve 441 is opened and the valves 411, 413 are in the closed state. However, the line 52 is currentless in normal operation. Consequently, the valve 451 is open and the valve 421 closed. The first piston chamber 21 thus communicates by way of the relief line 44, restrictor 442 and open valve 441 with atmosphere and the second piston chamber 22 also communicates with atmosphere because the valve 451 in the relief line 45 is open. Consequently, the piston 24 experiences no pressure difference; the resultant force of the product of atmospheric pressure times the different piston areas in the two piston chamber 21, 22 is negligibly small. However, the resultant force of the product of the medium pressure times the difference between the two end faces of the lid 13 is sufficient to keep the lid 13 open against the force of the spring 25, the back seat 16 being pressed into sealing-tight engagement with the abutment surface 17.

Substantially the same medium pressure as in the inlet 11 is operative in the lines 40, 41, 42 as far as the valves 411, 413, 421. The line 46 conveying the external medium is pressureless since the valve 50 in the line 46 prevents the supply of external medium.

Closure of the valve 1 is triggered either by the operating staff or automatically by a malfunctioning of the plant using the valve 1, the current in the line 51 being switched off. Valve 441 therefore closes and valves 411, 413 open. In a fraction of a second—the exact fraction depends upon the cross-section of the restrictor 412—pressure medium flows through the lines 40, 41 into the first piston chamber 21. The piston 24 together with the rod 23 and lid 13 therefore descends, as viewed,—i.e. they move towards the closed or safety position.

Initially, the full pressure of the pressure medium acts on the piston 24 in the chamber 21 but is still not operative in the second chamber 22 because of the restrictor 431 in the third connecting line 43. The piston 24 therefore descends very rapidly to start with, the second chamber 22 decreasing in size and a pressure arising therein which is somewhere between atmospheric pressure and the pressure in the chamber 21. Pressure medium discharges through the relief line 45.

During the initial movement of the piston 24, pressure medium flows through the third connecting line 43 into the second piston chamber 22 so that the pressure therein rises. This pressure increase provides a retardation or braking of the piston movement which is gentle to start with, then increases. The retardation is determined by the dimensioning of the cross-sections of the restrictors 431, 452. For example, the restrictor 452 may have the same flow cross-section as the restrictor 431.

With continued descent, the piston 24 covers the opening of the line 43 so that the supply of pressure medium from the chamber 21 to the chamber 22 ceases. Consequently, the increasing retardation ceases and the piston 24 then continues to move at a substantially constant speed—i.e., the lid 13 moves at the same speed on to the seat surface 15 in the valve casing 10. The lid 13 therefor settles on the surface 15 without any risk of damage thereto or to the sealing surface 14.

The provision of the third connecting line 43 ensures that after the first engagement of the lid 13 on the surface 15, the pressure in the chamber 22 does not increase and the lid 13 does not bounce at all on the seat surface. Also, when the lid 13 is in the safety position, there is no leakage of pressure medium from the first connecting line 41 through the third connecting line 43 to the relief line 45.

When the line 51 is reenergized, the valve 441 opens and the valves 411, 413 close so that the pressure in the first chamber 21 drops to atmospheric pressure. Simultaneously as the line 51 is energized, the line 52 is energized so that the valve 451 closes and the valve 421 opens. Pressure medium therefore enters the second chamber 22 to initiate an opening movement of the lid 13.

The moving system experiences a retardation in this opening movement after the piston 24 has passed by the junction of the third connecting line 43. High-pressure pressure medium then goes from the chamber 22 through the third connecting line 43 into the chamber 21, so that a retardation is operative towards the end of the ascent of the piston 24 and the lid 13 engages the surface 17 gently. The retardation operative in this movement of the moving system is determined by the dimensioning of the cross-section of the restrictor 442 relative to the cross-section of the restrictor 431.

After the open position has been reached, the line 52 returns to the deenergized state so that the valve 451 opens and the valve 421 closes. Normal operating conditions have therefore been restored.

The restrictor 442 has the important function of enabling the valve 1 to close and remain closed in the event of a malfunctioning and even of total destruction of the valve 441. The restrictor 442 enables pressure to build up in the chamber 21 with a continuous stowage of pressure medium through the then opened valves 411, 413.

As a variant of the embodiment shown in FIG. 1, the chain lines in FIG. 2 show the other end of the third connecting line 43 splitting into at least two parallel branches, the ends of which extend into the first piston chamber 21 when the piston 24 is in the safety position. The additional branch 43' reduces the risk of blockages of the third connecting line and thus increases valve reliability.

The valve 1 can have various safety redundancies. In the embodiment of FIG. 1, only the parallel-connected valves 411, 413 are shown as an example of such a redundancy since safety requirements are very stringent in that region. However, further redundancies can be provided, such as two parallel helical compression springs 25, in accordance with requirements and circumstances of space.

Of note, FIG. 1 illustrates the valve construction in a simplified manner. In a practical embodiment of the valve, all of the control and check valves as well as the lines with restrictors can be disposed within the contour of the valve, i.e. within the valve casing 10 and cylinder 2.

The invention thus provides a valve with a moving system which can be rapidly actuated towards a safety or operative position but which can be retarded immediately prior to impacting against an associated end surface.

Further, the invention provides a relatively simple connection which can be retro-fitted onto existing valves in order to effect a braking of the moving systems of the valves.

Still further, the invention provides a valve wherein a lid can move relatively fast but be retarded shortly before reaching an end position.

Furthermore, it is possible that the closed position of the lid 13 corresponds to the operative position of the piston 24 and the open position of the lid corresponds to the safety position of the piston.

What is claimed is:

1. A pressure medium actuated valve comprising
a casing having a valve chamber, an inlet for conveying a pressure medium to said chamber, an outlet for conveying pressure medium from said chamber and a cylinder sealingly spaced from said chamber;
a piston movably mounted in said cylinder to divide said cylinder into a first piston chamber which enlarges upon movement of said piston from an operative position to a safety position within said cylinder and a second piston chamber which decreases upon said piston movement;
a rod extending from said piston into said valve chamber;
a lid mounted on said rod within said valve chamber for closing said outlet from said valve chamber;
at least one spring in said cylinder biasing said piston towards said safety position;
a first relief line extending from said first piston chamber to a pressure medium sink;
a first control valve in said first relief line for controlling a flow of pressure medium therethrough;
a second relief line extending from said second piston chamber to a pressure medium sink;
a second control valve in said second relief line for controlling a flow of pressure medium therethrough;
a first connecting line between said valve chamber and said first piston chamber;
a third control valve in said first connecting line for controlling a flow of pressure medium therethrough;
a second connecting line between said valve chamber and said second piston chamber;
a fourth control valve in said second connecting line for controlling a flow of pressure medium therethrough; and
a third connecting line having one end connected to a chamber part extending from the cylinder-side end of said third control valve through said first connecting line, said first piston chamber and said first relief line to the cylinder-side end of said first control valve and a second end connected to said casing at a position which communicates with said second piston chamber with said piston in said operative position and which communicates with said first piston chamber with said piston in said safety position.

2. A valve as set forth in claim 1 which further comprises a restrictor in said third connecting line.

3. A valve as set forth in claim 2 which further comprises a second restrictor in said second relief line having at least the same flow cross-section as said restrictor in said third connecting line.

4. A valve as set forth in claim 1 wherein said third connecting line is disposed in said casing.

5. A valve as set forth in claim 1 which further comprises a wall part externally connectable to said cylinder and having a part of said third connecting line therein and a restrictor in said part of said third connecting line.

6. A valve as set forth in claim 5 which further comprises a second restrictor in said second relief line having at least the same flow cross-section as said restrictor in said third connecting line.

7. A valve as set forth in claim 1 wherein said second end of said third connecting line splits into at least two parallel branches which communicate with said first piston chamber with said piston in said safety position.

* * * * *